United States Patent
Yoshizawa et al.

(10) Patent No.: US 6,908,187 B2
(45) Date of Patent: Jun. 21, 2005

(54) INK-JET RECORDING METHOD

(75) Inventors: Tomomi Yoshizawa, Hachioji (JP); Shuji Kida, Iruma (JP)

(73) Assignee: Konica Corporation, Tokyo (JP)

( * ) Notice: Subject to any disclaimer, the term of this patent is extended or adjusted under 35 U.S.C. 154(b) by 40 days.

(21) Appl. No.: 10/618,243

(22) Filed: Jul. 10, 2003

(65) Prior Publication Data

US 2004/0027434 A1 Feb. 12, 2004

(30) Foreign Application Priority Data

Jul. 18, 2002 (JP) ........................................ 2002-209539

(51) Int. Cl.[7] ................................................. B41J 2/01
(52) U.S. Cl. ......................... 347/100; 347/101; 347/105
(58) Field of Search ................................. 347/100, 101, 347/96, 105, 95; 106/31.13, 31.27, 31.6; 428/195, 32.1; 523/160

(56) References Cited

U.S. PATENT DOCUMENTS 6,761,788 B2 * 7/2004 DeYoung et al. ........ 428/32.39
2001/0025588 A1 * 10/2001 Takemoto et al. ....... 106/31.36

* cited by examiner

Primary Examiner—Manish Shah
(74) Attorney, Agent, or Firm—Frishauf, Holtz, Goodman & Chick, P.C.

(57) ABSTRACT

An ink-jet recording method providing an ink containing a fine resin particle, a water-soluble dye, water and an organic solvent to an ink receiving sheet comprising a support and a porous ink receiving layer coated on the support is disclosed. In the method the difference of $D_{L10}$ in the particle diameter distribution of the fine resin particle in the ink and $D_{M50}$ in the pore diameter distribution of the porous layer measured using a mercury porosimeter ($D_{L10}-D_{M50}$) is not more than 170 nm.

11 Claims, 2 Drawing Sheets

INK-JET RECORDING METHOD

FIELD OF THE INVENTION

This invention relates to an ink-jet recording method, and specifically, an ink-jet recording method improved in resistivity to color bleeding and glossiness of the recorded image.

BACKGROUND OF THE INVENTION

In ink-jet recording methods, a fine droplet of ink is ejected by various principles to adhere onto a recording sheet to record an image or a character. This method has advantages such as relative high speed recording, low noise and easy multi-color recording.

Recently, the ability of printers to produce a high quality image has progressed and the image quality approaches that of photographic images. Accordingly, it is desired for recording sheets to equal the image quality of conventional photographs and to reproduce the feeling of silver halide photographs such as glossiness, smoothness and stiffness.

Known as a method for reproducing the feeling of silver halide photographs is the use of so called swelling type ink receiving sheet which is constituted of a support and a hydrophilic binder layer such as gelatin and poly(vinyl alcohol) coated onto the support. However, a method has drawbacks such that the ink absorbing speed being too slow, the surface after recording tends to be sticky and the image easily bleeds during storage under high humidity. Specifically, bleeding between different colors and bleading of the same color caused by the mixing of ink droplets before absorption of the ink tend to occur since the absorption speed of the ink is slow. Consequently, the image quality of the silver halide photograph is very difficult to be attained.

High glossiness and suitable ink absorption can be attained by the combination of an aqueous dye ink and a porous type ink receiving sheet, and image quality approaches the level of photographs.

In addition, the storage stability of the ink-jet image compares favorably with that of usual photographs, accompanied with the improvement of quality of images produced by ink-jet recording. In such situations, it is pointed out, particularly in the case of aqueous dye ink, that the degradation caused by migration of the colorant due to weak resistivity to water and bleeding, and degradation caused by chemical reaction of colorants such as low light fastness and resistivity to oxidants.

Various trials have been performed to attain the image quality of ink-jet recorded images to the level of silver halide photographs. Examples of technology for improving low light fastness are disclosed in Japanese Patent Publications Open to Public Inspection, hereinafter referred to as JP-A, 57-74192, 57-87989, 57-74193, 58-152072, 64-36479, 1-95091, 1-115677, 3-13376, 4-7189, 7-195824, 8-25796, 11-321090, 11-277893 and 2000-37951.

In the case of porous type ink receiving sheets, one problem is discoloration of images caused by toxic gases, such as oxidant gas tends to be produced due to the porous structure. Such problem often occurs with phthalocyanine type water-soluble dye which is used in typical color ink-jet printers.

It is assumed that the discoloration is caused by the oxidation of the dye by a slight amount of reactive toxic gases in ambient air such as ozone, $SO_x$, $NO_x$, and other oxidants since the fine porous structure has a large surface area and the inorganic fine particles used in the porous structure has an active surface. However, the mechanism of this discoloration is not yet confirmed.

Technologies for improving the discoloration are disclosed, for example, in JP-A63-252780, 64-11877, 1-108083, 1-216881, 1-218882, 1-258980, 2-188287, 7-237248, 7-266689 and 8-164664. However, the effects of the known technology are insufficient in the ink receiving sheet to achieve photographic quality images having a still more fine porous structure. Accordingly, more drastic improvement is demanded.

A method of adding film resin particles into the water-soluble dye ink is known as one of the methods for minimizing discoloration. However, it has been found that color bleeding of the ink tends to occur when the image is printed onto ink receiving sheets having the porous ink receiving layer by ink containing latex. It is assumed that the color bleeding occurs due to the latex contained in the ink closing the pores on the surface of the porous type ink receiving layer in the course of absorption of the ink into the ink receiving layer, whereby the ink absorbing ability of the ink receiving sheet is lowered.

The glossiness of the surface of the ink receiving layer is an important factor in forming a bright color image when a photograph like image is formed via the ink-jet recording methods. The glossiness of the image is lowered and the brightness of the color is degraded when an ink containing latex is used, even if the glossiness of the surface of the ink receiving layer is high.

SUMMARY OF THE INVENTION

The object of this invention is to provide an ink-jet recording method resulting in an image excellent in resistivity to discoloration by the oxidant gas and the glossiness.

1. An ink-jet recording method comprising the step of;

providing an ink to an ink receiving sheet, wherein the ink comprises fine resin particles, a water-soluble dye, water and an organic solvent, and the ink receiving sheet comprises a support and a porous ink receiving layer having pores provided on the support, and the ink and the ink receiving sheet satisfy the following formula $|D_{L10}-D_{M50}| \leq 170$ nm, wherein $D_{L10}$ is the particle diameter at which 10 percent of the fine resin particles in number have a diameter from a minimum diameter $D_{L0}$ up to and including $D_{L10}$, and $D_{M50}$ is the pore diameter layer measured using a mercury porosimeter at which 50 percent of the pores in volume have a diameter from a minimum diameter $D_{M0}$ up to and including $D_{M50}$.

2. $D_{L10}-D_{M50}$ is preferably not more than 65 nm.
3. $D_{L10}-D_{M50}$ is preferably not less than 0.
4. $D_{L10}-D_{M50}$ is more preferably not less than 20 nm.
5. The polydispersity index of the particle diameter distribution of the fine resin particles in the ink is from 0.1 to 0.3.
6. The average particle diameter of the fine resin particles in the ink is from 10 to 150 nm.
7. The ink receiving layer contains the fine resin particles.
8. The $D_{M50}$ in the pore diameter distribution in the ink receiving layer is from 15 to 40 nm.
9. The minimum film forming temperature (MFT) of the fine resin particle in the ink is from 0 to 60° C.
10. The surface roughness of the ink receiving layer is not more than 10 nm.

11. The support of the ink receiving sheet has a continuous layer of a thermoplastic resin.

BRIEF DESCRIPTION OD THE DRAWING

Figure 1:
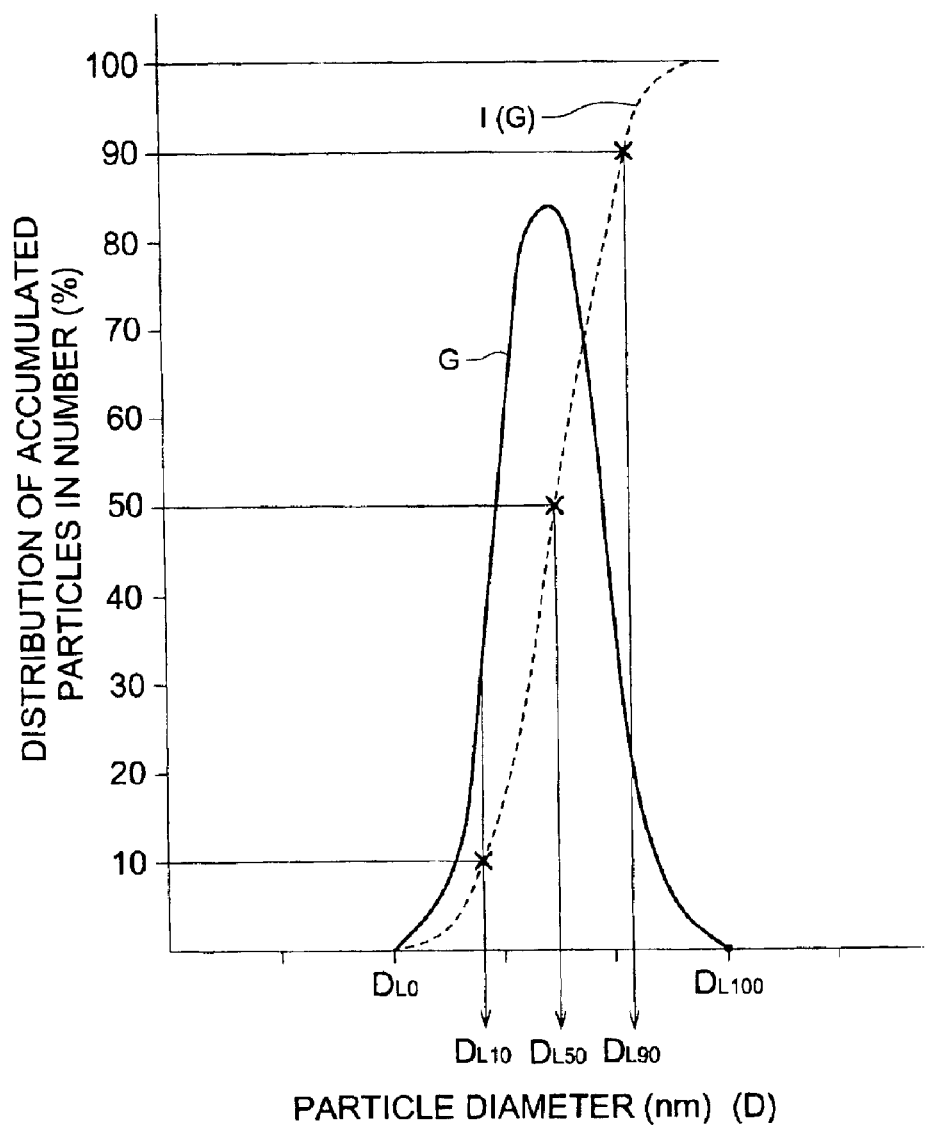
FIG. 1 shows the distribution curve of the fine resin particles and represents $D_{L10}$, $D_{L50}$ and $D_{L90}$ related to this invention.

In FIG. 1, G is the particle diameter distribution curve of the fine resin particles in number, I is the integral curve of the distribution of the particle diameter of the fine resin particles in percent.

DETAILED DESCRIPTION OF THE INVENTION

The inventors have investigated methods for improving resistivity to oxidant gases, color bleeding and glossiness of the image formed by aqueous inks and ink receiving sheets having a porous ink receiving layer. As a result of these investigations, it was found that discoloration caused by oxidant gases is particularly reduced when the image is formed on the ink receiving sheet by aqueous ink containing fine resin particles and the resin particles remaining on the surface of the ink receiving sheet after printing form a film due to diffusion or evaporation of the organic solvent. It has been further found that the above-mentioned object can be attained by making the difference between $D_{L10}$ in the particle diameter distribution of the fine resin particles in the ink and the $D_{M50}$ in the pore diameter distribution in the ink receiving layer measured by the mercury porosimeter ($D_{L10}$-$D_{M50}$) to be a value within a specified range. The film formation is due to the fact that the fine resin particles adheres onto the outermost surface of the ink receiving sheet and the fine particles are fused to form a layer.

It was further found that the effects of the above-mentioned method can be enhanced by the use of resin particles having a polydispersity index of from 0.1 to 3.0, the use of the fine resin particles having an average particle diameter of from 10 to 150 nm, the use of an ink receiving layer containing fine resin particles, the use of fine resin particles having a minimum film forming temperature of from 0 to 60° C. or the use of a support having a continuous layer of a thermoplastic resin.

This ink-jet recording method comprises the step of providing an ink containing fine resin particles, water-soluble dye, water and organic solvent onto the ink receiving sheet comprising a support and a porous ink receiving layer coated on the support, in which the difference of $D_{L10}$ in particle diameter distribution of the fine resin particles in the ink and the $D_{M50}$ in the pore diameter distribution of the porous layer measured using a mercury porosimeter ($D_{L10}$-$D_{M50}$) is not more than 170 nm. The difference ($D_{L10}$-$D_{M50}$) is preferably not more than 65 nm. The difference ($D_{L10}$-$D_{M50}$) is preferably not less than 0 nm, more preferably not less than 20 nm. The polydispersity index of the particle diameter distribution of the fine resin particles in the ink is preferably from 0.1 to 0.3.

The determination method of the $D_{L10}$ in the particle diameter distribution of the fine resin particles in the ink and the polydispersity index of the particle diameter distribution of the fine resin particles in the ink relating to this invention are described below.

The $D_{L10}$ and the polydispersity index PDI of the resin particles in the invention are defined by the followings.

The polydispersity index in the invention is an index representing the particle diameter distribution of the fine resin particles contained in the ink, which is defined by the following Formula 1.

Formula 1

$$PDI=(D_{L90}-D_{L10})/D_{L50}$$

In Formula 1, $D_{L10}$, $D_{L50}$ and $D_{L90}$ each represents a particle diameter equal to the integral curve I(G) of the particle diameter distribution curve, in FIG. 1, is 10%, 50% and 90% in number of the total number of the fine resin particles, respectively. G is a particle diameter distribution curve of the fine resin particles in number and D is the particle diameter of the fine resin particles as abscissa shown in FIG. 1. $D_{L0}$ and $D_{L100}$ represent diameters of minimum and maximum particle respectively among the fine resin particles. Ten percent of the particles in number have a diameter from the minimum diameter $D_{L0}$ up to and including $D_{L10}$. Similarly, 50 percent of the particles in number have a diameter from $D_{L0}$ up to and including $D_{L50}$, and 90 percent of the particles in number have a diameter from $D_{L0}$ up to and including $D_{L90}$. Therefore, $D_{L10}$ is the particle diameter at which 10 percent of the particles in number have a diameter from $D_{L0}$ up to and including $D_{L10}$. Similarly, $D_{L50}$ is the particle diameter at which 50 percent of the particles in number have a diameter from $D_{L0}$ up to and including $D_{L50}$, and $D_{L90}$ is the particle diameter at which 90 percent of the particles in number have a diameter from $D_{L0}$ up to and including $D_{L90}$.

The above Formula is described referring to the drawing.

In FIG. 1, the abscissa designates the diameter D of the fine resin particles. The continuous line G is the particle number distribution curve of the fine resin particle, and the broken line I(G) is a curve of the accumulated number of the fine particles shown in percent. The points of the number of accumulated particles of 10%, 50% and 90% are shown on the broken line I(G) by the cross mark and the diameter corresponding to the accumulated particle number of 10%, 50% and 90% are shown by $D_{L10}$, $D_{L50}$ and $D_{L90}$.

In the above Formula, the value of PDI approaches 0 when the particle diameter distribution is narrower, and the value of PDI is larger when the diameter distribution is wider.

The particle diameter can be measured by a transmission electron microscope observing randomly selected approximately 1,000 particles to obtain particle distribution curve, or a particle diameter measuring apparatus available in the market according to a light scattering method, an electrophoresis method and a laser trap method, for example, laser refraction particle diameter measuring apparatus SLAD 1100, manufactured by Shimadzu Corp., particle diameter measuring apparatus Horiba LA-920, manufactured by Horiba Seisakusho Co., Ltd., and Zetasizer 1000, manufactured by Malvern Co., Ltd.

Figure 2:
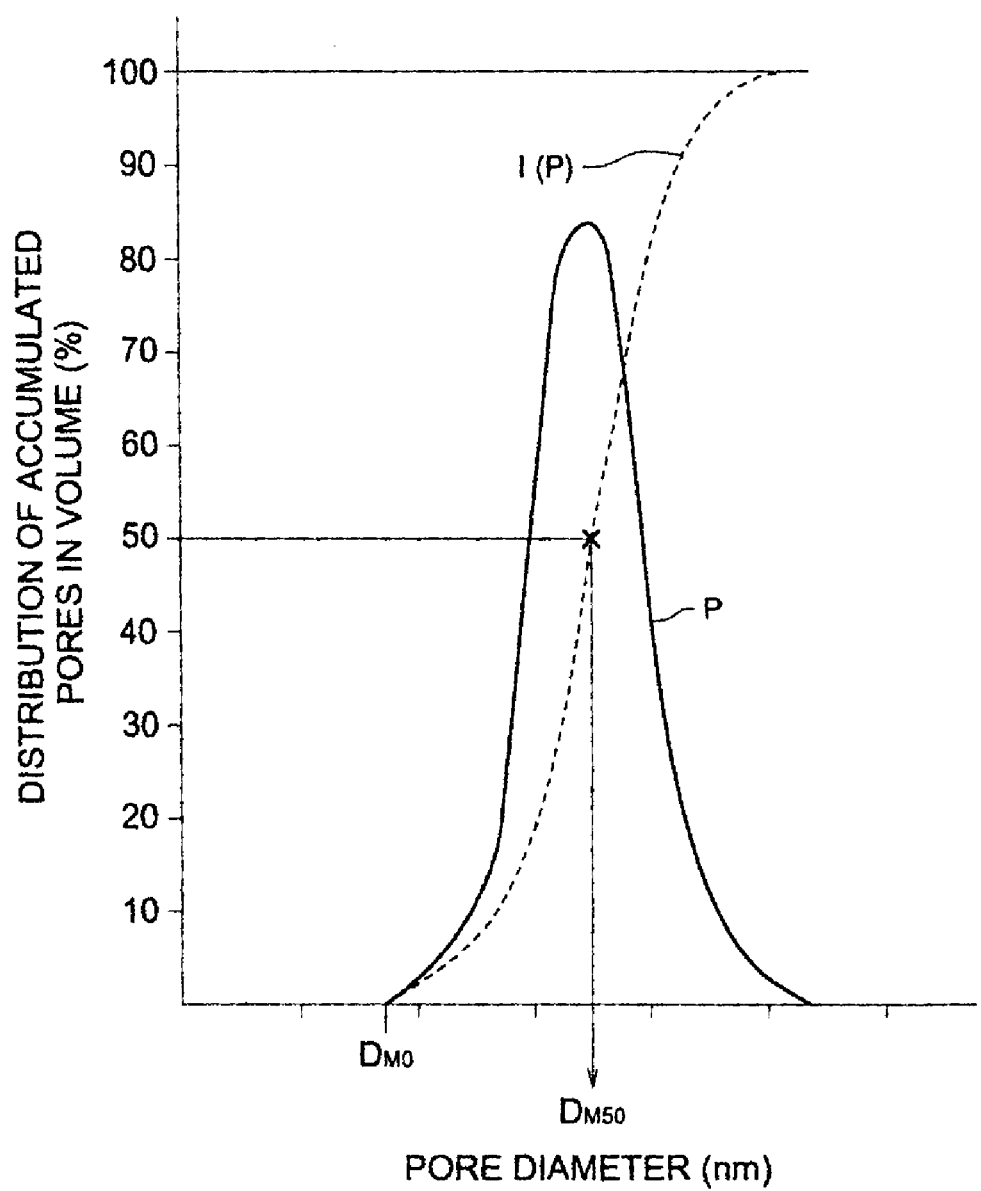
FIG. 2 shows a distribution curve of the pore diameter distribution of the porous layer of an ink receiving sheet measured using a mercury porosimeter, and represents $D_{M50}$.

$D_{M50}$ in the diameter distribution of pores in the ink receiving layer represents a diameter equal to the integral of the distribution function of the pores in the ink receiving layer I(P) of 50% in volume, shown in FIG. 2.

In FIG. 2, the abscissa designates the diameter D of the pore. The continuous line P is the distribution curve of the pore in volume, and the broken line I(P) is a curve of the accumulated the pores in volume shown in percent. The points of the accumulated pore of 50% in volume is shown on the broken line I(G) by the cross mark and the diameter corresponding to the accumulated pore volume of 50% is shown by $D_{M50}$.

Fifty percent of the pores in volume have a diameter from the minimum pore diameter $D_{M0}$ up to and including $D_{M50}$. Therefore, $D_{M50}$ is the pore diameter at which 50 percent of the pores in volume have a diameter from $D_{M0}$ up to and including $D_{M50}$.

The pore diameter distribution in the ink receiving layer can be determined, for example, from the diameter distribution curve which is prepared by a method in which the surface of the ink receiving layer is observed by a transmission electron microscope and the diameter of approximately 1,000 pores randomly selected are measured. However, in the invention, a value measured by the mercury porosimeter, specifically Shimazu Porelizer 9220, under an initial pressure of 0.1 MPa is used. When no signal is detected by such a method, $D_{M50}$ is measured to be zero.

The average surface roughness is preferably not more than 10 nm.

The method for measuring the average surface roughness is described below.

The average surface roughness represents the microscopic unevenness of the microscopic surface area of the ink receiving layer on the ink receiving sheet. The average surface roughness is measured using the method defined by JIS B-0601. In the invention, the value determined via an atomic force microscope is applied. The average surface roughness of the ink receiving layer is measured before printing at the surface of the ink receiving layer, on which the image is to be printed.

An example of the measurement method using an atomic force microscope is described below. As such atomic force microscope, a probe station SPI 3800N and a multifunctional unit SPA 400, each manufactured by Seiko Instruments Co., Ltd., may be used. A 1 cm square sample is placed on a horizontal sample setting table provided on a piezo scanner and the cantilever is brought close to the sample surface so as to be in the inter atomic force affecting range. Then the sample surface is scanned in the X and Y directions while detecting the unevenness of the surface by variation of the piezo element in the Z direction. As such piezo scanner, one capable of scanning in the range of 20 µm in the X and Y directions and 2 µm in the Z direction is used. As the cantilever, silicon cantilever SI-DF 20, manufactured by Seiko Instruments Co., Ltd., with a resonance frequency of from 120 to 150 Hz and a spring constant of from 12 to 20 N/m is used. The measurement is performed in the dynamic force mode (DFM). The measuring area of a 2 µm square was measured by one or two viewing fields at a scanning frequency of 1 Hz. A slight slant of the sample is calibrated by minimum square approximation of thus obtained three dimensional data, which defines the standard plane.

The average surface roughness is determined from three dimensional data by applying the surface roughness analysis of "Analysis Menu" of analyzing software SPIwin ver. 2.05D2, by Seiko Instruments Co., Ltd.

The measured surface determined by the measurement is represented by $Z=F(X, Y)$. The limitation of $(X, Y)$ is from $(0, 0)$ to $(X_{max}, Y_{max})$. When such a surface is defined as the designated surface to be subjected to analysis, the surface area $S_0$ can be calculated by the following Formula.

$$S_0 = X_{max} \cdot Y_{max}$$

When the average value of data of Z in the designated surface is $Z_0$ and the plane on which $Z=Z_0$, $Z_0$ is calculated by the following Formula.

$$Z_0 = \frac{1}{S_0} \int_0^{Y_{max}} \int_0^{X_{max}} F(X,Y) dX dY$$

Further, in JIS B601, the center-line average roughness Ra is defined as the value calculated by the following Formula when a part to be measured of length L is extracted from a roughness curve, and the direction of the center line of the extracted part is defined as the X-axis and the direction of height or perpendicular to the X-axis is defined as the Y-axis.

$$Ra = \frac{1}{L} \int_0^L |F(X)| dX$$

When the average surface roughness $Ra_1$ is defined by three dimensionally extending the center-line average roughness Ra to be suit the measured surface, $Ra_1$ is represented by the average of the absolute value of the deviation from the standard plane to the designated plane. $Ra_1$ can be calculated by the following Formula.

$$Ra_1 = \frac{1}{S_0} \int_0^{Y_{max}} \int_0^{X_{max}} |F(X,Y) - Z_0| dX dY$$

In the invention, the average surface roughness of the ink receiving layer is preferably from 0.1 to 10 nm.

In the invention, the value $(D_{L10}-D_{M50})$ can be controlled by selecting the suitable kind, average diameter and the added amount of the resin particles, and the using resin particles having the specific minimum film forming temperature.

Resin particles relating to the invention are described below.

The resin particles to be added to the ink is a polymer particles dispersed in a medium such as water, which is commonly called a latex.

These resin particles may be used as an aqueous dispersion of various kinds of polymers such as an acryl polymer, a styrene-acryl polymer, an acrylonitrile-acryl polymer, a vinyl acetate polymer, a vinyl acetate-acryl polymer, a vinyl acetate-vinyl chloride polymer, a urethane polymer, a silicone-acryl polymer, an acryl-silicone polymer, a polyester polymer and an epoxy polymer.

Such polymers are usually produced by an emulsion polymerization method. A usual surfactant and polymerization initiator may be used for the polymerization process. The synthesis method of the fine resin particle is described in, for example, U.S. Pat. Nos. 2,852,368, 2,853,457, 3,411,911, 3,411,912 and 4,197,127, Belgian Patent Nos. 688,882, 691,360 and 712,832, JP-B 45-5331 and JP-A 60-18540, 51-130217, 58-137831 and 55-50240.

The average diameter of the fine resin particles are preferably from 10 to 150 nm, more preferably from 10 to 100 nm.

The average diameter of the fine resin particle can be easily measured using a particle diameter measuring apparatus based on a light scattering method or a laser Doppler method, which is available on the market, such as Zetasizer 1000 manufactured by Malburn Co., Ltd.

The content of the fine resin particles in the ink is preferably from 0.2 to 10%, more preferably from 0.5 to 5% by weight. When the added amount of the fine resin particle is not less than 0.2% by weight, the light fastness effect of color is enhanced; and when the amount is not more than 10% by weight, the ejection property of the ink is further stabilized and an increase in the viscosity of the ink during storage is inhibited, which is preferable.

The minimum film forming temperature, MFT, of the fine resin particles is preferably from 0 to 60° C. In the invention, a film forming aid may be added to control the minimum film forming temperature of the fine resin particles. Such film forming aid may be an organic compound, but is usually an organic solvent, a so called plasticizer which lowers the minimum film forming temperature of the polymer latex. Such plasticizer is described, for example, in S. Muroi, "Gousei Latex no Kagaku (Chemistry of Synthesized Latex)", Koubunshi Kankoukai, 1970.

In the invention, it is preferable to add fine resin particles into the ink receiving layer of the ink receiving sheet additionally into the ink.

The ink to be used in the invention contains at least a water-soluble dye, water and an organic solvent in addition to the fine resin particle.

Water soluble dyes usable in this invention include, for example, such as azo dyes, methine dyes, azomethine dyes, xanethene dyes, quinone dyes, phthalocyanine dyes, triphenylmethane dyes and diphenylmethane dyes, concrete compounds are listed below. However, this invention is not limited to these exemplified compounds.

(C.I. Acid Yellow)
1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246

(C.I. Acid Orange)
3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168

(C.I. Acid Red)
1, 6, 8, 9, 13, 18, 27, 35, 37, 52, 54, 57, 73, 82, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415

(C.I. Acid Violet)
17, 19, 21, 42, 43, 47, 48, 49, 54, 66, 78, 90, 97, 102, 109, 126

(C.I. Acid Blue)
1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350

(C.I. Acid Green)
9, 12, 16, 19, 20, 25, 27, 28, 40, 43, 56, 73, 81, 84, 104, 108, 109

(C.I. Acid Brown)
2, 4, 13, 14, 19, 28, 44, 123, 224, 226, 227, 248, 282, 283, 289, 294, 297, 298, 301, 355, 357, 413

(C.I. Acid Black)
1, 2, 3, 24, 26, 31, 50, 52, 58, 60, 63, 107, 109, 112, 119, 132, 140, 155, 172, 187, 188, 194, 207, 222

(C.I. Direct Yellow)
8, 9, 10, 11, 12, 22, 27, 28, 39, 44, 50, 58, 86, 87, 98, 105, 106, 130, 132, 137, 142, 147, 153

(C.I. Direct Orange)
6, 26, 27, 34, 39, 40, 46, 102, 105, 107, 118

(C.I. Direct Red)
2, 4, 9, 23, 24, 31, 54, 62, 69, 79, 80, 81, 83, 84, 89, 95, 212, 224, 225, 226, 227, 239, 242, 243, 254

(C.I. Direct Violet)
9, 35, 51, 66, 94, 95

(C.I. Direct Blue)
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291

(C.I. Direct Green)
26, 28, 59, 80, 85

(C.I. Direct Brown)
44, 106, 115, 195, 209, 210, 222, 223

(C.I. Direct Black)
17, 19, 22, 32, 51, 62, 108, 112, 113, 117, 118, 132, 146, 154, 159, 169

(C.I. Basic Yellow)
1, 2, 11, 13, 15, 19, 21, 28, 29, 32, 36, 40, 41, 45, 51, 63, 67, 70, 73, 91

(C.I. Basic Orange)
2, 21, 22

(C.I. Basic Red)
1, 2, 12, 13, 14, 15, 18, 23, 24, 27, 29, 35, 36, 39, 46, 51, 52, 69, 70, 73, 82, 109

(C.I. Basic Violet)
1, 3, 7, 10, 11, 15, 16, 21, 27, 39

(C.I. Basic Blue)
1, 3, 7, 9, 21, 22, 26, 41, 45, 47, 52, 54, 65, 69, 75, 77, 92, 100, 105, 117, 124, 129, 147, 151

(C.I. Basic Green)
1, 4

(C.I. Basic Brown)
1

(C.I. Reactive Yellow)
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176

(C.I. Reactive Orange)
1, 4, 5, 7, 11, 12, 13, 15, 16, 20, 30, 35, 56, 64, 67, 69, 70, 72, 74, 82, 84, 86, 87, 91, 92, 93, 95, 107

(C.I. Reactive Red)
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235

(C.I. Reactive Violet)
1, 2, 4, 5, 6, 22, 23, 33, 36, 38

(C.I. Reactive Blue)
2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236

(C.I. Reactive Green)
8, 12, 15, 19, 21

(C.I. Reactive Brown)
2, 7, 9, 10, 11, 17, 18, 19, 21, 23, 31, 37, 43, 46

(C.I. Reactive Black)
5, 8, 13, 14, 31, 34, 39 are listed, and the dyes listed above are described in such as "Dyeing Notebook 21st edition" (published by Shikisen-Sha).

Among these water-soluble dyes, preferable are phthalocyanine dyes. Phthalocyanine dyes include those which are unsubstituted or have a center element which is a metal or a non-metal, but preferably copper, and more preferably C.I. Direct Blue 199.

The organic solvent usable in this invention are not specifically limited, but water soluble organic solvents are preferable. Examples of the water-soluble solvents include an alcohol such as methanol, ethanol, propanol, isopropanol, butanol, isobutanol, secondary butanol, tertiary butanol, pentanol, hexanol, cyclohexanol and benzyl alcohol; a polyvalent-alcohol such as ethylene glycol, diethylene glycol, triethylene glycol, polyethylene glycol, propylene glycol, dipropylene glycol, polypropylene glycol, butylenes glycol, hexanediol, pentanediol, glycerine, hexanetriol and thiodiglycol; a polyvalent-alcohol ether such as ethylene glycol monomethyl ether, ethylene glycol monoethyl ether, ethylene glycol monobutyl ether, ethylene glycol monophenyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, tripropylene glycol dimethyl ether; an amine such as ethanolamine, diethanol amine, triethanolamine, N-methyldiethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; an amide such as formamide, N,N-dimethylformamide and N,N-dimethylacetoamide; a heterocyclic compound such as 2-pyrrolidone, N-methyl-2-pyrrolidone, N-cyclohexyl-2-pyrrolidone, 2-oxazolidone and 1,3-dimethyl-2-imidazolidinone; a sulfoxide such as dimethylsuofoxide; a sulfone such as sulfolane; a sulfonate such as 1-buthanesulfonate sodium salt; urea; acetonitrile and acetone.

Various surface active agents may be employed in ink of this invention. Usable surface active agents in this invention are not specifically limited, but examples include anionic surface active agents such as dialkylsulfosuccinates, alkylnaphthalenesulfonates, and fatty acid salts; nonionic surface active agents such as polyoxyethylenealkyl ethers, polyoxyethylenealkylallyl ethers, acetylene glycols, and polyoxyethylene-polyoxypropylene block copolymers; and cationic surface active agents such as alkylamine salts, and quaternary ammonium salts. Specifically, anionic and nonionic surface active agents are preferably employed.

Further, polymer surface active agents may also employed in the ink of this invention. Examples include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid half-ester copolymers, vinylnaphthalene-acrylic acid copolymers, and vinylnaphthalene-maleic acid copolymers.

In addition to the foregoing compounds, various commonly known additives such as a viscosity controlling agent, a surface tension controlling agent, a specific resistance controlling agent, a layer forming agent, an anti-mold agent and a rust preventing agent may be added to the ink composition aimed at the objective of improving the properties of the ink such as ejection stability, suitability to the print head or cartridge, and storage stability, and the image stability and other properties. The additives include oil particles of, such as, fluid paraffin, dioctyl phthalate, tricresyl phosphate, silicon oil etc.; a UV absorbent disclosed in JP-A 57-74193, 57-87988 and 62-261476; an anti-fading agent disclosed in JP-A 57-74192, 57-87988, 60-72785, 61-146591, 1-95091 and 3-13376; and a fluorescent brightening agent disclosed in JP-A 59-42993, 59-52689, 62-280069, 61-24271 and 4-219266.

Subsequently, the ink jet recording medium of this invention will be described.

Generally, an ink absorbing layer is divided into a swelling type and a porous type, and ink absorbing layers except the outermost layer may be a porous type or a swelling type, or a combination of these two types. In this invention, preferred is to use the ink-jet recording sheets in which the outermost layer has a porous structure. The other ink absorbing layer other than the outermost layer may be a porous layer or other layer working as an ink absorbing layer.

A porous type ink absorbing layer will be further detailed below.

The porous layer is formed primarily by weak coagulation of a water soluble binder and fine organic particles. Heretofore, various methods to form pores in film are known, of which for example, the following methods are applicable: a method in which a uniform coating liquid containing two or more kinds of polymer is coated on a substrate and the pores are formed by phase separation of the polymers in the course of drying of the coated layer; a method in which a coating liquid containing solid particles and a hydrophilic or hydrophobic binder is coated on a substrate and dried, and the thus dried ink-jet recording paper is immersed in water or a liquid containing suitable organic solvent to dissolve the solid particles to form the pores; a method in which a coating liquid containing a substance capable of foaming during layer formation is coated on a substrate and foam is formed from the substance in the course of drying to form the pores; a method in which a coating liquid containing fine porous particles and a hydrophilic binder is coated on a substrate to form the pores in or between the porous solid particles; and a method in which a coating liquid containing a hydrophilic binder and solid particles and/or fine oil droplets in an amount at least equal in volume of the hydrophilic binder is coated on the substrate to form pores between the solid particles. In this invention, it is specifically preferable that the pores are formed by a method of containing various inorganic fine solid particles having an average particle size of at most 100 nm in the porous layer.

Cited as examples of the inorganic fine particles used for the above purpose may be white inorganic pigments such as light precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, silica, alumina, colloidal alumina, pseudo boehmite, aluminum hydroxide, lithopone, zeolite, and magnesium hydroxide.

The average diameter of the fine inorganic particles may be calculated as follows. The particles themselves, or the cross-section or surface of a porous layer, is observed employing an electron microscope, and each diameter of 1,000 randomly selected particles is determined. The simple average (the numerical average) is obtained as the diameter of the particles based on the determined diameter. Herein, each particle diameter is represented by the diameter of a circle having the same projection area as that of the particle.

Fine solid particles selected from silica, alumina and alumina hydrate are preferably used as fine inorganic particles.

In this invention, it is preferable that at least one ink absorbing layer featuring a porous structure contains fine silica particles. Silica synthesized with a typical wet method, colloidal silica or silica synthesized with a gas phase method may be employed as usable silica in this invention, and further, specifically preferable is fine particle silica in this invention, colloidal silica and silica synthesized using a gas phase method. Of these, silica synthesized with a gas phase method is preferable not only for the high void ratio which can be obtained, also for hard formation of coarse aggregates when added to the later-mentioned cationic polymers used for fixing dyes. Alumina and alumina hydrate may be crystalline or amorphous, and optional shapes of undetermined form, spherical or needle-shaped may also be employed.

The fine inorganic particles in fine particle dispersed solution before mixing to cationic polymers are preferably dispersed in a primary particle state.

The particle size of fine inorganic particles is preferably not more than 100 nm. For example, in case of the foregoing silica synthesized via a gas phase method, the average particle size of primary particles of fine inorganic particles dispersed in a primary particle state (the particle size in the state of a dispersed solution before coating) is preferably at most 100 nm, more preferably 4–50 nm, and still more preferably 4–20 nm.

As the most preferably used silica synthesized via a gas phase method having an average particle size of primary particles of 4–20 nm, is Aerosil produced by Nippon Aerosil Co., Ltd. which is commercially available. This fine particle silica synthesized by a gas phase method is relatively easily dispersed into primary particles in water using Jet-stream Inductor Mixer manufactured by Mitamura Riken Kogyo Co., Ltd., employing suction dispersion.

Water soluble binders may be incorporated into the ink absorbing layer of the present invention. Listed as examples of the water soluble binders usable in this invention are: polyvinyl alcohol, gelatin, polyethylene oxide, polyvinylpyrrolidone, polyacrylic acid, polyacryl amide, polyurethane, dextran, dextrin, carageenan (κ, ι, λ), agar, pullulan, water soluble polyvinyl butyral, hydroxyethyl cellulose, and carboxymethyl cellulose. These water soluble binders may be used in combinations of more than two kinds.

In this invention, it is preferable that at least one ink absorbing layer, featuring a porous structure, contains polyvinyl alcohol.

Polyvinyl alcohols employed in the present invention include common polyvinyl alcohol prepared by hydrolyzing polyvinyl acetate, and in addition, modified polyvinyl alcohol such as terminal cation-modified polyvinyl alcohol and anion-modified polyvinyl alcohol having an anionic group.

The average degree of polymerization of polyvinyl alcohol prepared by hydrolyzing vinyl acetate is preferably 1,000 or more, and is more preferably 1,500–5,000. Further, the saponification ratio is preferably 70–100%, and is more preferably 80–99.5%.

Cation-modified polyvinyl alcohols are, for example, polyvinyl alcohols having a primary to a tertiary amino group, or a quaternary ammonium group on the main chain or side chain of the foregoing polyvinyl alcohols as described in JP-A 61-10483, and are obtained upon saponification of copolymers comprised of ethylenic unsaturated monomers having a cationic group or vinyl acetate.

Listed as ethylenic unsaturated monomers having a cationic group are, for example, trimethyl-(2-acrylamido-2,2-dimethylethyl) ammonium chloride, trimethyl-(3-acrylamido-3,3-dimethylpropyl) ammonium chloride, N-vinylimidazole, N-vinyl-2-methylimidazole, N-(3-dimethylaminopropyl) methacrylamide, hydroxyethyltrimethylammonium chloride, trimethyl-(2-methacrylamidopropyl) ammonium chloride, and N-(1,1-dimethyl-3-dimethylaminopropyl) acrylamide.

The content ratio of monomers containing a cation-modified group of the cation-modified polyvinyl alcohol is commonly 0.1–10 mol % to the vinyl acetate, and is preferably 0.2–5 mol %.

Listed as anion-modified polyvinyl alcohols are, for example, polyvinyl alcohols having an anionic group as described in JP-A 1-206088, copolymers of vinyl alcohols and vinyl compounds having a water solubilizing group as described in JP-A Nos. 61-237681 and 63-307979, and modified polyvinyl alcohols containing a water solubilizing group, as described in JP-A 7-285265.

Further, listed as nonion-modified polyvinyl alcohols are, for example, polyvinyl alcohol derivatives in which a polyalkylene oxide group is added to a part of polyvinyl alcohol as described in JP-A 7-9758, and block copolymers of vinyl compounds having a hydrophobic group and polyvinyl alcohols as described in JP-A 8-25795. Further, various types of polyvinyl alcohols, in which the degree of polymerization or modification differs, may be employed in a combination of at least two types.

The added amount of fine inorganic particles, employed in the ink absorbing layer, varies largely depending on the desired ink absorption capacity, the void ratio of the porous layer, the types of fine inorganic particles, and the types of water soluble binders, but is generally 5–30 $g/m^2$ of the recording sheet, and is preferably 10–25 $g/m^2$.

The ratio of fine inorganic particles to a water soluble binder, employed in the ink absorbing layer, is generally 2:1–20:1 by weight, and is preferably 3:1–10:1.

The content of the cationic polymers is usually 0.1–10 $g/m^2$ of an ink jet recording sheet, and preferably in the range of 0.2–5 $g/m^2$.

The total amount of pores (meaning void volume) in the porous layer is preferably at least 20 ml per $m^2$ of the recording sheet. In cases when the void volume is less than 20 $ml/m^2$, ink absorbability is adequate with only low ink volume at printing, but incomplete ink absorption at a high volume of ink tends to result in problems of lowered image quality or protracted ink drying.

In porous layers exhibiting ink retention ability, the void volume to the volume of solids is defined as the void ratio. It is preferred to maintain a void ratio of at least 50% in this invention, effectively forming pores without an unnecessarily thick layer.

It is preferred to use a hardening agent in this invention. The hardening agent may be added at any appropriate time during production of the ink-jet recording sheet, and can, for instance, be added into the coating composition to form an ink absorbing layer.

In this invention, a method to apply a hardening agent to a water soluble binder may employed by itself, but is preferably employed in combination with a method adding the foregoing hardening agent into the coating composition to form an ink absorbing layer.

Usable hardening agents of this invention are not limited as long as they cause a hardening reaction in a water soluble binder, and preferably used is boric acid and salts thereof, while in addition other commonly known compounds may also be used. Generally, hardening agents are compounds having a group capable of reacting with water soluble binder, or accelerating a reaction between different groups contained in the water soluble binder, and are appropriately used depending on the type of a water soluble binder. Examples of hardening agents are epoxy type hardening agents (e.g., diglycidyl ethyl ether, ethylene glycol diglycidyl ether, 1,4-butanediol diglycidyl ether, 1,6-diglycidylcyclohexane, N,N-diglycidyl-4- glycidyloxyaniline, sorbitol polyglycidyl ether, and glycerol polyglycidyl ether); aldehyde type hardening agents (e.g., formaldehyde and glyoxal); active halogen type hardening agents (e.g., 2,4-dichloro-4-hydroxy-1,3,5-s-trizine); and active vinyl type compounds (e.g., 1,3,5-trisacryloyl-hexahydro-s-triazine, and bisvinylsulfonyl methyl ether); and aluminum alum.

Boric acid and salts thereof refer to oxygen acid having a boron atom as the central atom and/or salts thereof, and specifically include orthoboric acid, diboric acid, metaboric acid, tetraboric acid, pentaboric acid, and octaboric acid, and salts thereof.

Hardening agents of boric acid and salts thereof having a boron atom may be used in the form of a solution thereof, by itself or in a mixture of two or more kinds. Specifically preferred is a mixed solution of boric acid and borax.

Generally only a boric acid solution and a borax solution are each added in relatively diluted solutions, but a denser solution can be obtained by mixing both solutions, resulting in a concentrated coating composition. Further, there is a benefit by adjusting the pH of the added solution to a specific level.

The total added amount of the foregoing hardening agents is preferably 1–600 mg/g of the foregoing water soluble binder.

Substrates usable in the present invention are common ones for an ink-jet recording sheet, which may be appropriately chosen from paper substrates such as standard paper, art paper, coated paper and cast-coated paper; plastic substrates; paper substrates coated on both sides with polyolefin; and complex substrates of pastes of these substrates. In the embodiment of this invention, employed substrates are preferably not-water absorptive. In this invention, plastic substrates or paper substrates coated on both sides with polyolefin in non-water absorptive substrates are specifically preferable because of their superior oxidizing gas resistance. Because of a closer approach to a photographic image of the recorded image, and obtaining high image quality at lower cost, a non-water absorptive substrate is specifically preferable.

Raw paper substrates covered on both sides with polyolefin are described below.

The raw material used for such paper substrates is made of wood pulp as the principal raw material, and synthesized pulp of polypropylene and synthesized fibers of nylon or polyester may be added to the wood pulp based on function. As wood pulp, any of LBKP, LBSP, NBKP, NBSP, LDP, NDP, LUKP and NUKP may also be used. It is preferable that LBKP, NBSP, LBSP, NDP and LDP, each containing mostly short fibers are used in a larger amount. However, the content of LBSP or LDP is preferably from 10%–70% by weight.

As the foregoing pulp, chemical pulp (sulfate pulp and sulfite pulp) even with a small amount of impurities is preferably employed. Bleached pulp enhanced in whiteness is also advantageously used. Into the raw paper pulp, an additive, such as, a sizing agent for example a higher fatty acid or an alkylketene dimer; a white pigment such as calcium carbonate, talc, or titanium oxide; a paper strength increasing agent such as starch, polyacrylamide or polyvinyl alcohol; a fluorescent brightening agent; a moisture holding agent such as polyethylene glycol; a dispersion agent; and a softening agent such as a quaternary ammonium may suitably be added.

The beating degree of the pulp to be used for paper making is preferably from 200–500 ml according to the definition of CSF. As to the fiber length of the pulp after beating, it is preferable that the total of 24 mesh remaining ingredients and 42 mesh remaining ingredients defined by JIS-P-8207 is from 30–70% by weight. The 4 mesh remaining ingredients are preferably not more than 20% by weight. The basis weight of the raw paper is preferably 30–250 g/m$^2$, and specifically more preferably 50–200 g/m$^2$. The thickness of the raw paper is preferably 40–250 μm. The raw paper may be treated to high smoothness by calendering in the course of or after the paper making. The density of the raw paper (JIS-P-8118) is usually 0.7–1.2 g/m$^2$, while the stiffness of the raw paper is preferably 20–200 g according to the condition defined by JIS-P-8143. A surface sizing agent may be coated onto the surface of the raw paper. As the surface sizing agent, the same sizing agent as added to the foregoing raw paper can be used. The pH of the raw paper is preferably 5–9 when the pH is measured by the hot water extraction method defined in JIS-P-8113.

Although the polyethylene covering both surfaces of the raw paper is composed mainly of low density polyethylene (LDPE) and/or high density polyethylene (HDPE), alternatively LLDPE (linear low density polyethylene) or polypropylene may also be used at a partial level. Specifically, the polyethylene layer on the ink absorbing layer side is preferably one containing rutile or anatase type titanium oxide to improve opacity and whiteness of the polyethylene layer such as is widely used for photographic paper. The content of titanium oxide to polyethylene is usually 3–20 weight %, and preferably 4–13%.

Polyethylene laminated paper may be used in this invention, not only for a glossy paper surface but also for a matte or silk surface usually used in photographic paper, which is formed by an embossing treatment during extrusion of polyethylene onto the raw paper.

The utilized amount of polyethylene providing on the front or rear surface of the raw paper is chosen so that the paper exhibits suitable curling after provision of the porous layer and the backing layer. The thickness of the polyethylene layer on the porous layer side is usually 20–40 μm, and that of the polyethylene layer on the backing layer side is usually in the range of 10–30 μm.

Further, the foregoing paper substrate covered with polyethylene preferably exhibits the following properties:

1. Tensile strength: tensile strength in the longitudinal direction is preferably 20–300 N and that in the lateral direction is 10–200 N in terms of strength specified in JIS-P-8113.

2. Tear strength: tear strength in the longitudinal direction is preferably 0.1–20 N and 2–20 N in the lateral direction when determined employing the method specified in JIS-P-8116.

3. Compression elastic modulus $\geq$98.1 Mpa

4. Surface Bekk smoothness: smoothness of a glossy surface is preferably 20 sec or more under the condition specified in JIS-P-8119, but that of so-called embossed surfaces may be lower value.

5. Surface roughness: surface roughness specified in JIS-B-0601 is preferably at most 10 μm at a maximum height per standard length of 2.5 mm.

6. Opacity: when measured employing the method specified in JIS-P-8138, the opacity is preferably 80% or more, and specifically more preferably 85–98% or more.

7. Whiteness: when measured employing the method specified in JIS-Z-8729, L*, a*, b* are each preferably L*=80–95, a*=−3–+5, and b*=−6–+2.

8. Surface glossiness: 60-degree specular glossiness specified in JIS-Z-8741 is preferably 10–95%.

9. Clark stiffness: a substrate exhibiting a Clark stiffness of 50–300 cm$^2$/100 in the transfer direction of the recording sheet is preferable.

10. Moisture content in core paper: the moisture content of the core paper is usually preferably 2–100 weight % to the core paper, and more preferably 2–6 weight %. Further, plastic substrates usable in this invention may be transparent or opaque, and various resin film may be employed. Polyolefin film (e.g., polyethylene and polypropylene), polyester film (e.g., polyethylene terephthalate and polyethylene naphthalate), polyvinyl chloride and cellulose triacetate may be used, however polyester film is preferably used. Polyester film (hereinafter, referred to simply as polyester) is not specifically limited, but preferred is a polyester exhibiting a film forming capability, which is comprised of a dicarboxylic acid component and a diol component, as primary constituents. Examples of primary constituents of the dicarboxylic acid components include terephthalic acid, isophthalic acid, phthalic acid, 2,6-naphthalenedicarboxylic acid, 2,7-naphthalenedicarboxylic acid, diphenylsulfonedicarboxylic acid, diphenyl ether dicarboxylic acid, diphenylethanedicarboxylic acid, cyclohexanedicarboxylic acid, diphenyldicarboxylic acid, diphenyl thioether dicarboxylic acid, diphenylketonedicarboxylic acid, and phenylindandicarboxylic acid. Further, examples of diol components include ethylene glycol, propylene glycol, tetramethylene glycol, cyclohexenedimethanol, 2,2-bis(4-hydroxyphenyl) propane, 2,2-bis(4-hydroxyethoxyphenyl) propane, bis(4-hydroxyphenyl) sulfone, bisphenolfluorene dihydroxyethyl ether, diethylene glycol, neopentyl glycol, hidroquinone, and cyclohexanediol. Of polyesters comprised of these constituents, from the viewpoint of transparency, mechanical strength, and dimensional stability, preferred as primary constituents is polyester comprised of a dicarboxylic acid component of terephtalic acid or 2,6-naphthalenedicarboxylic acid and a diol component of ethylene glycol or 1,4-cyclohexanedimethanol. Of these polyesters, preferred as primary constituents are polyesters comprised of polyethyleneterephthalate or polyethylenenaphthalate as primary constituents, or copolymerized polyesters comprised of terephthalic acid, 2,6-naphthalenedicarboxylic acid and ethylene glycol, and polyesters comprised of mixtures of more than two kinds of these polyesters.

Next, the preparation method of a recording sheet of the present invention will be described.

An ink jet recording sheet is manufactured employing a procedure in which each component layers including, an ink absorbing layer, are each individually or simultaneously coated on a substrate with a preparation method adequately selected from commonly known coating methods and dried. As a coating method, preferably employed are a roller coating method, a rod or bar coating method, an air knife coating method, a spray coating method, a curtain coating method, a slide bead coating method using hoppers described in U.S. Pat. Nos. 2,761,419 and 2,761,791, or an extrusion coating method.

Viscosity of each coating composition in simultaneous multi-layer coating is preferably in the range of 5–100 mPa·s, and more preferably in the range of 10–50 mPa·s, in the case of a slide bead coating method. While, in the case of a curtain coating method, the viscosity is preferably in the range of 5–1,200 mPa·s, and more preferably in the range of 25–500 mPa·s.

Further, the viscosity of the coating composition at 15° C. is preferably at least 100 mPa·s, more preferably 100–30,000 mPa·s, still more preferably 3,000–30,000 mPa·s, and yet more preferably 10,000–30,000 mPa·s.

In one of the preferable embodiment coating compositions are warmed to 30° C. or higher and are coated simultaneously to form multiple layers, which are cooled to 1 to 15° C. and dried at 10° C. or higher. Preparation of the coating composition, coating and drying are preferably conducted at a temperature under Tg of the thermoplastic resin, so that the thermoplastic resin to form the surface layer would not form a film during the preparation of the coating composition, coating and drying process. More preferable drying condition is that the wet-bulb temperature is 5 to 50° C. and the surface layer temperature is 10 to 50° C.

The coated layer just after the coating is cooled preferably by a vertical type in view of uniform coating layer.

EXAMPLES

The invention is described in detail below referring examples.

Example 1

Preparation of Ink Receiving Sheet

Ink receiving sheets 1 and 2 were prepared by the following procedures.

Preparation of Ink Receiving Sheet 1

Preparation of Support 1

Low density polyethylene having a density of 0.92 was coated on the back side of raw paper for photographic use at a weight of 200 g/m$^2$ and a moisture content of 6% to so that the layer thickness to 35 μm. Next, low density polyethylene at a density of 0.29, containing 5.5% of anatase type titanium oxide, was applied to the surface side of the raw paper by an extrusion coating method at a thickness of 40 μm to prepare a support coated with the polyethylene on both sides. The surface side of the support was treated by corona discharge and coated by a subbing layer of polyvinyl alcohol with a coating weight of 0.03 g/m$^2$. The back side of the support was also subjected to the corona discharge treatment and coated with a latex layer at a coated weight of 0.12 g/m$^2$. Support 1 was thus prepared.

Preparation Dispersions

Preparation of Silica Dispersion 1

In 480 L of purified water containing 10 l of methanol, pH of which was adjusted to 2.5 by nitric acid, 160 kg of gas phase method silica QS-20, produced by Tokuyama Co., Ltd., at an average primary particle diameter of 12 nm was dispersed by reduction at room temperature by a Jet-stream Inductor Mixer TDS, manufactured by Mitamura Riken Kogyo Co., Ltd. The total amount of the dispersion was brought to 600 L by purified water to prepare Silica Dispersion 1.

Preparation of Silica Dispersion 2

To 15 L of an aqueous solution containing 2.12 kg of cationic polymer HP-1, 2.2 L of ethanol and 1.1 L of n-propanol at a pH of 2.3, 60.0 L of the above-prepared Silica Dispersion 1 were added while stirring and then 8.0 L of an aqueous solution containing 320 g of boric acid and 190 g of borax was added and 200 ml of an aqueous solution containing 2 g of anti-foaming agent SN 381, produced by SAN NOPCO LIMITED was further added.

The mixture was dispersed by a high pressure homogenizer manufactured by Sanwa Kogyo Co., Ltd., and the total amount of the dispersion was brought to 85 L by purified water to prepare Silica Dispersion 2.

Cationic polymer HP-1

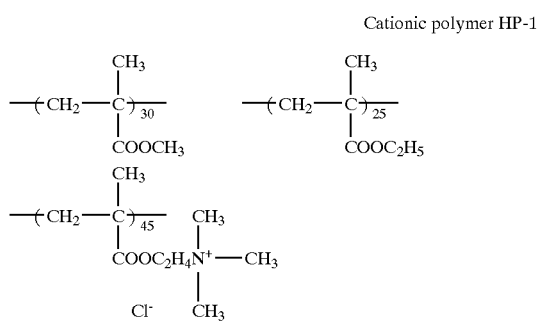

Preparation of Coating Liquid
Preparation of Coating Liquid 1
To 650 ml of the above-prepared Silica Dispersion 2, the following additives were successively added while stirring at 40° C. to prepare Coating Liquid 1.

| | |
|---|---|
| 10% aqueous solution of polyvinyl alcohol PVA 203, (Kuraray Kogyo Co., Ltd.) | 6 ml |
| 5% aqueous solution of poly (vinyl alcohol) PVA 235, (Kuraray Kogyo Co., Ltd.) | 260 ml |
| 5% aqueous solution of poly (vinyl alcohol) PVA 245, (Kuraray Kogyo Co., Ltd.) | 95 ml |
| 30% aqueous solution of Surfactant S-1 | 4 ml |
| 10% aqueous solution of anionic fluorescent whitening agent UVITEX New Liquid 9 (Specialty Chemicals Co., Ltd.) | 10 ml |

The total amount of the liquid was brought to 1000 ml by purified water. The pH value of the liquid was 4.5.

Surfactant S-1

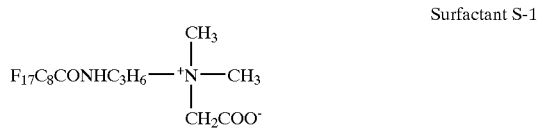

Preparation of Ink Receiving Sheets
Preparation of Ink Receiving Sheet 1
The above prepared Coating Liquid 1 was coated on a support so that the wet thickness of the coated layer was 140 μm and cooled to about 7° C. Then the coated layer was dried with 20 to 65° C. blown air of from to prepare Ink receiving Sheet 1.

The average surface roughness of the recording side of the above-prepared Ink receiving Sheet 1 measured using an atomic force microscope was 3.6 nm. The $D_{M50}$ measured by the mercury porosimeter, Shimazu Porelizer 9220, under the condition of the initial pressure of 0.1 MPa was 30 nm.
Preparation of Ink Receiving Sheet 2

Ink receiving Sheet 2 was prepared in the same manner as Ink receiving Sheet 1 except that the following Silica Dispersion 3 was used in place of Silica Dispersion 1.
Preparation of Silica Dispersion 3

In 480 L of purified water containing 10 L of methanol, in which pH was adjusted to 2.5 using nitric acid, 160 kg of gas phase method silica Aerosil 300, produced by Nihon Aerosil Co., Ltd., at an average primary particle diameter of 7 nm was dispersed by reduction at room temperature using a Jet-stream Inductor Mixer TDS, manufactured by Mitamura Riken Kogyo Co., Ltd. The total amount of the dispersion was brought to 600 L with purified water to prepare Silica Dispersion 3.

The average surface roughness of the recording side of the above-prepared Ink receiving Sheet 2, measured using an atomic force microscope was 3.3 nm. $D_{M50}$ was 23 nm, measured using a mercury porosimeter, Shimazu Porelizer 9220, under the condition of the initial pressure of 0.1 MPa.
Preparation of Dye Ink
Dye Inks 1 through 8 were prepared according to the following procedure.
Preparation of Dye Ink 1

| | |
|---|---|
| C. I. Direct Blue 199 | 3% by weight |
| Diethylene glycol | 25% by weight |
| Sodium dioctylsulfosuccinate | 0.01% by weight |
| Fine resin particle SF 150*[1] | 2% by weight |

The total amount of the mixture was brought to 100% by weight using water to prepare Dye Ink 1.
*[1]Fine particle of urethane resin Superflex 150 with an MFT of 5° C. and average diameter of 91 nm, available from Dai-Ichii Kogyo Seiyaku Co., Ltd.

$D_{L10}$, $D_{L50}$ and polydispersity index of SF 150 measured using Zetasizer 1000, manufactured by Malvern Ltd., using a laser Doppler method, were each 60 nm, 91 nm and 0.203, respectively.
Preparation of Dye Inks 2 through 8

Dye Inks 2 through 8 were prepared in the same manner as Dye Ink 1 except that the fine resin particles described in Table 1 were respectively used in each of the inks instead of SF 150.

The fine resin particles used in each of Dye Inks 2 through 8 were as follows.

SF 420: Urethane resin fine particle Superflex 420 with an MFT of 20° C., from Dai-Ichi Kogyo Seiyaku Co., Ltd.

E-4000: Urethane resin fine particle E series E 4000 with MFT of 5° C., from Dai-Ichi Kogyo Seiyaku Co., Ltd.

AD 57: Acryl resin fine particle Yodosol AD 57 with an MFT of 60° C., from National Starch and Chemical Co, Japan KD 81B: Acryl resin fine particle Yodosol KD 81B with an MFT of 20° C., from National Starch and Chemical Co, Japan GD 900: Acryl resin fine particle Yodosol GD 900 with an MFT of −15° C., from National Starch and Chemical Co, Japan AE 173: Acryl resin fine particle with an MFT of 80° C., from JSR Co., Ltd., Japan

TABLE 1

| | Fine resin particle | | | |
|---|---|---|---|---|
| Dye Ink No. | Code Name | $D_{L10}$ (nm) | $D_{L50}$ (nm) | Poly-dispersity index | MFT (° C.) |
| 1 | SF150 | 60 | 91 | 0.203 | 5 |
| 2 | AE173 | 62 | 70 | 0.102 | 80 |
| 3 | AD57 | 90 | 130 | 0.061 | 60 |
| 4 | GD900 | 96 | 124 | 0.061 | −15 |
| 5 | SF420 | 30 | 54 | 0.427 | 20 |
| 6 | KD81B | 135 | 161 | 0.101 | 20 |
| 7 | E-2500 | 200 | 349 | 1.00 | 40 |
| 8 | E-4000 | 233 | 341 | 1.00 | 5 |

Formation of an Ink-Jet Image
Each of the above-prepared Dye Inks 1 through 8 was charged to an ink cartridge installed in an MJ 800C printer, manufactured by Seiko-Epson Co., Ltd., and a solid color image was printed on each of the ink receiving sheets in the combinations described in Table 2. The ejecting amount of ink was set at 10 ml/m².

Measurement and Evaluation of the Ink-Jet Image

The above-printed cyan images were subjected to measurement and evaluation using the following method.

Evaluation of Resistivity to Oxidant Gas: Discoloration Property

Each of the printed images was exposed for 120 minutes to an environmental having an ozone content of 50 ppm at 23° C. The reflective optical density of the sample was measured via monochromatic red light using a densitometer X-Rite 938, manufactured by X-Rite Co., Ltd., before and after the exposure. The image remaining ratio was calculated using the following Formula and the resistivity to oxidant gas was evaluated using the following norms.

Image remaining ratio=Density after exposure/Density before exposure×100%

A: The image remaining ratio was not less than 90%.

B: The image remaining ratio was not less than 65% and less than 90%.

C: The image remaining ratio was less than 65%.

Evaluation of Resistivity to Color Bleeding

Color bleeding occurred at the boundary of the solid printed cyan image and white background was visually observed, and the resistivity to color bleeding of the sample was evaluated using the following norms.

A: Almost no bleeding at the boundary of the solid image was observed.

B: Slight bleeding at the boundary of the solid image was observed.

C: Considerable bleeding at the boundary of the solid image was observed.

Evaluation of Glossiness of the Image

Each of the printed samples was compared to a glossy type silver halide photograph of the same image as the printed image to judge how the glossiness of the printed image compared with the silver halide photograph. The evaluation was visually performed by 20 ordinary observers and the result was judged according to the following norms.

A: More than fifteen observers judged that the sample was comparable to the silver halide photograph.

B: Five to fourteen observers judged that the sample was comparable with the silver halide photograph.

C: Fewer than four observers judged that the sample was comparable to the silver halide photograph.

Thus obtained results are shown in Table 2.

As is apparent from Table 2, images printed when the difference between the $D_{M50}$ in the pore diameter distribution in the porous ink receiving layer and the $D_{L10}$ in the particle diameter distribution of the fine resin particles contained in the ink containing the fine resin particles, the water-soluble dye, water and organic solvent ($D_{L10}-D_{M50}$) was not more than 170 nm, are superior to the comparative samples in resistivity to oxidant gas, color bleeding and the glossiness of image. Further, it can be confirmed that such the effects are enhanced when the fine resin particles having an average particle diameter of from 10 to 150 nm and an MFT from 0 to 60° C.

Example 2

Evaluations for Example 2 were performed in the same manner as for Example 1 except that yellow ink Y, magenta ink M, black ink K were used in place of the cyan Dye Inks 1 through 8. Results similar to those of Example 1 were obtained for each of the inks.

Example 3

The four color inks of Y, M, C and K prepared in Examples 1 and 2, and low density four color inks Ly, Lm, Lc and Lk were installed in an ink-jet printer Iguaz 1044SD, manufactured by Konica Corp., and an image was printed on Ink receiving Sheet 1 prepared in Example 1. In each of the low density inks, the content of the water-soluble dye was reduced to ¼ of the amount of the dye contained in each of the inks of Y, M, C and K. Images excellent in resistivity to oxidant gases, resistivity to the color bleeding and image glossiness were obtained.

The ink-jet recording method excellent in the resistivity to the oxidant gas, resistivity to the color bleeding and the glossiness of image can be provided by the invention.

What is claimed is:

1. An ink-jet recording method comprising:

providing an ink to an ink receiving sheet, wherein the ink comprises fine resin particles, a water-soluble dye, water and an organic solvent, wherein the ink receiving sheet comprises a support and a porous ink receiving layer which has pores and is provided on the support, and wherein the ink and the ink receiving sheet satisfy the following formula

TABLE 2

| Printed image No. | Ink receiving sheet No. | $D_{M50}$ (nm) | Ink (Fine resin particle) No. | $D_{L10}$ (nm) | $D_{L10} - D_{M50}$ | Evaluation results | | | Remarks |
|---|---|---|---|---|---|---|---|---|---|
| | | | | | | Resistivity to oxidant gas | Color bleeding | Image glossiness | |
| 1 | 1 | 30 | 1 | 60 | 30 | A | A | A | Inv. |
| 2 | 1 | 30 | 2 | 62 | 32 | B | A | A | Inv. |
| 3 | 1 | 30 | 3 | 90 | 60 | A | A | B | Inv. |
| 4 | 1 | 30 | 4 | 96 | 66 | A | B | B | Inv. |
| 5 | 2 | 23 | 5 | 30 | 7 | A | B | A | Inv. |
| 6 | 2 | 23 | 3 | 90 | 77 | B | A | B | Inv. |
| 7 | 2 | 23 | 8 | 135 | 112 | B | A | B | Inv. |
| 8 | 2 | 23 | 9 | 200 | 177 | C | B | C | Comp. |
| 9 | 1 | 30 | 10 | 233 | 203 | C | B | C | Comp. |

Inv.; Inventive
Comp.; Comparative $|D_{L10}-D_{M50}|\leq 170$ nm, where:

$D_{L10}$ is particle diameter at which 10 percent of the fine resin particles by number have a diameter from a minimum diameter $D_{L0}$ up to and including $D_{L10}$, and $D_{M50}$ is a pore diameter measured using a mercury porosimeter at which 50 percent of the pores by volume have a diameter from a minimum diameter $D_{M0}$ up to and including $D_{M50}$.

2. The ink-jet recording method of claim 1, wherein $D_{L10}-D_{M50}$ is not more than 65 nm.

3. The ink-jet recording method of claim 1, wherein $D_{L10}-D_{M50}$ is not less than 0.

4. The ink-jet recording method of claim 1, wherein $D_{L10}-D_{M50}$ is not less than 20 nm.

5. The ink-jet recording method of claim 1, wherein a polydispersity index (PDI) of the particle diameter distribution of the fine resin particles in the ink is from 0.1 to 0.3, where:

$PDI=(DL90-DL10)/DL50$.

DL50 is a particle diameter at which 50 percent of the fine resin particles by number have a diameter from a minimum diameter DL0 up to and including DL50, and DL90 is a particle diameter at which 90 percent of the fine resin particles by number have a diameter from a minimum diameter DL0 up to and including DL90.

6. The ink-jet recording method of claim 1, wherein an average particle diameter of the fine resin particles in the ink is from 10 to 150 nm.

7. The ink-jet recording method of claim 1, wherein the ink receiving layer contains fine resin particles.

8. The ink-jet recording method of claim 1, wherein $D_{M50}$ is from 15 to 40 nm.

9. The ink-jet recording method of claim 1, wherein minimum film forming temperature (MFT) of the fine resin particle in the ink is from 0 to 60° C.

10. The ink-jet recording method of claim 1, wherein surface roughness of the ink receiving layer is not more than 10 nm.

11. The ink-jet recording method of claim 1, wherein the support of the ink receiving sheet comprises a continuous layer of a thermoplastic resin.

* * * * *